United States Patent
Goossen et al.

(10) Patent No.: US 7,168,048 B1
(45) Date of Patent: Jan. 23, 2007

(54) METHOD AND STRUCTURE FOR IMPLEMENTING A LAYERED OBJECT WINDOWS

(75) Inventors: J. Andrew Goossen, Issaquah, WA (US); Vadim Gorokhovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/535,096

(22) Filed: Mar. 24, 2000

Related U.S. Application Data

(60) Provisional application No. 60/126,002, filed on Mar. 24, 1999.

(51) Int. Cl.
*G06F 15/00* (2006.01)
*G06F 13/00* (2006.01)

(52) U.S. Cl. .................. 715/797; 715/796; 345/429

(58) Field of Classification Search ............... 715/765, 715/766, 768, 803, 805, 797, 796, 794, 790; 345/419, 429
See application file for complete search history.

(56) References Cited

U.S. PATENT DOCUMENTS

| | | | | |
|---|---|---|---|---|
| 5,651,107 A | * | 7/1997 | Frank et al. | 715/768 |
| 6,072,489 A | * | 6/2000 | Gough et al. | 715/803 |
| 6,121,960 A | | 9/2000 | Carroll et al. | |
| 6,151,030 A | * | 11/2000 | DeLeeuw et al. | 345/592 |
| 6,538,660 B1 | * | 3/2003 | Celi et al. | 345/592 |

* cited by examiner

*Primary Examiner*—Cao (Kevin) Nguyen
(74) *Attorney, Agent, or Firm*—Shook, Hardy & Bacon, L.L.P.

(57) ABSTRACT

A display window is attributed a layering attribute such that underlying display windows are blended with the layered display window and displayed on the display screen. In a first embodiment, the layered window and the underlying window are represented as bitmaps. Any overlapping portions of the underlying window bitmap are redirected to an underlay buffer and composited with the layered window bitmap according to a display order and an opacity level. In a second embodiment, the layered window and the underlying window are represented as hardware sprites. Graphics device hardware stores copies of each sprite and composites each sprite according to a display order and an opacity level. In either embodiment or in a combination of both, as the layered window is moved or resized, the stored data allows for updating the composite display without requiring system expensive display regenerations.

18 Claims, 9 Drawing Sheets

METHOD AND STRUCTURE FOR IMPLEMENTING A LAYERED OBJECT WINDOWS

This application is entitled to priority pursuant to a provisional application filed Mar. 24, 1999, Ser. No. 60/126,002.

TECHNICAL FIELD

In general, the present invention relates to computer software, and more particularly, to a method and structure for implementing layered windows on a computer display screen.

BACKGROUND OF THE INVENTION

Personal computers (PCs) such as IBM-compatible PCs typically include hardware devices such as a processor and a memory for implementing various software programs, a principal one being a central operating environment. In turn, the operating environment, or operating system, supports the variety of other software applications such as a word processing program or a spreadsheet program.

Some operating systems include a graphical user interface (GUI), described generally as a graphical operating system, which displays various information to the user as a combination of pictures and text that the user can manipulate. Generally, some graphical operating systems instigate an instance of a software application by displaying the various text, graphics and features of the application within a rectangular window. One conventional method of displaying information includes the use of multiple windows drawn on a single screen for displaying outputs from, and inputs to, multiple sources at one time. Although multiple windows can arise from a single program on a computer, the typical screen includes windows from different programs executing independently of each other on the computer, or even on different computers configured to a common display.

Generally, the presence of multiple display windows on the same physical location on the display screen requires some control over the manner in which the conflicting windows interact with one another. In one system, a window manager is provided by the operating system to obtain display information from multiple applications and manage the manner in which they are presented on the display screen according to a display order. Typically, the display order is defined in terms of the window's placement along a virtual "z" axis of the display screen. This is generally described as the "z" order. In other words, similar to a stack of papers, the windows are stacked in a virtual z order, which defines which window will be on top of the stack and obscure other windows below it. Thus, the window manager resolves conflicts between the windows by stacking the windows in a numerical order. For example, a single window may be enlarged to cover the entire display screen, thereby acquiring a higher z order. Accordingly, the higher z order window would obscure any other window having a lower z order.

Since a typical computer system may be processing information related to many applications with corresponding windows, it may be desirable for a user to simultaneously view more than one application window. One method for viewing multiple application windows is to size the windows such that they are all displayed within the display screen. However, the user typically only views portions of the desired information in each application window if the application window is sized in its default display size. Alternatively, the information within the application window can also be resized such that all the information fits within the window display. However, the size of the information typically becomes sufficiently small that it is not easily understandable. Although larger screen sizes or multiple monitors have been attempted to resolve this problem, these solutions are expensive and take up much physical space. In addition, a change in an application window's z order would cause the contents of the window to rise ahead of other application windows possibly obscuring previously displayed windows.

In a typical operating environment, the graphical operating system defines a desktop that includes a screen display containing images of icons representative of applications available to the user, as well as active and inactive application programs displayed as windows within the desktop screen display. An active application program is an application that frequently regenerates the image displayed in its window because events associated with the program frequently change. Each time an event occurs, the application communicates with the operating system causing its window to be regenerated, incorporating the change. Examples of active application programs are programs that display a clock or a ticker tape or an animated character within the operating environment. Inactive programs, on the other hand, are programs that do not require frequent regeneration of the image displayed in their respective window. A word processing or spreadsheet program displaying a document in its respective window is an example of an inactive program. Such programs, however, can become active if the display is scrolled or if they are required to present a new display.

Because the desktop typically includes background displays, such as the icons, inactive windows, and active windows, performance problems occur as windows are manipulated, such as by moving, resizing, or animating them. In some conventional operating environments, the object on the desktop with the highest z order exclusively owns each pixel within its window on the display screen. Accordingly, any other object having a lower z order would not be allowed to write data to the display screen for occupying the particular pixel. For example, if a first inactive application window overlaps a portion of a second inactive application window, the overlapped portion of the second window is not sent to the display. Thus, if the first window is moved or resized, thereby exposing the previously overlapped portion of the second window, the operating system requires the second application to regenerate the overlapped portion of the window, which could require the application to regenerate the entire window. However, because the second window is inactive, the regeneration would not have been required by the application and, consequently, wastes system resources. Additionally, in terms of multiple moves, such as "dragging" a window across the screen or an animated window, this type of action often results in numerous window regenerations at great expense to the system resources. For example, frames of an animated sequence are typically regenerated at 10–12 frames per second. If each successive frame of animation uncovers a single pixel of an inactive application window, the operating system would have to request a regeneration of the underlying window 10–12 times per second. Often, this not only reduces operating system performance, but also results in unwanted display flicker.

Another deficiency associated with conventional graphical operating systems is the requirement that each object displayed on the desktop be confined within a rectangular window. Thus, if the object to be displayed is a circle, such as smiley face, it would be displayed within the confines of a rectangular window. If then the corner of the window overlaps another underlying window, the corner of the window would block out portions of the underlying window even though the corner was not being utilized to display information. One method of correcting this deficiency is to reproduce portions of the underlying background within the unused portion of the window. With reference to the smiley face example, the four corners would be painted with the text or graphics from the underlying window. However, if the object directly below the window changes, the top window would not automatically change with it. Thus, the regeneration of a background window causes the other windows to regenerate as well. Moreover, if the background window is active, such as a clock, this would require the top window to regenerate at the same rate.

Thus, there is a need to provide a method and structure for managing the interaction between two or more overlapping display objects such that system resource utilization and display screen quality are optimized.

SUMMARY OF THE INVENTION

The present invention satisfies the above-described need by providing a layered object structure and method in which underlying display objects are blended with one or more layered objects.

Generally described, the present invention provides a method in a computer system for displaying two or more overlapping windows on a computer display. The method utilizes a computer system having a graphical user interface implementing a windowing environment. The method displays any non-overlapping portions of the windows on the display, blends any overlapping portions of the windows, and displays the blended overlapping portions of the windows on the display.

In another aspect of the present invention, a method in a computer system for displaying two or more overlapping bitmaps on a computer display is provided. The method redirects any overlapping portions of a first of the two or more bitmaps to one or more underlay buffers, composites a second of the two or more bitmaps with the overlapping portions of the first bitmap, and displays the composited second bitmap and any non-overlapping portions of the first bitmap.

In a further aspect of the present invention, a layering engine in a computer system for displaying a layered object and one or more underlying objects on a computer display is provided. The layering engine includes one or more underlay buffers containing data indicative of overlapping portions of the one or more underlying objects and a composition buffer for receiving underlay buffer data and for compositing the data according to a display order.

In yet another aspect of the present invention, a computer system display having one or more applications generating objects to be displayed is provided. The computer system display includes a processor for executing the applications and a display device coupled with the processor for displaying the application objects. The display device displays objects such that a first portion of any overlapping objects is blended and displayed as one or more sprites and a second portion of any overlapping objects is redirected to an underlay buffer and blended and displayed. Additionally, the display device displays the objects such that any non-overlapping portions of the objects are displayed in a non-blended manner.

In another aspect of the present invention, a computer-readable medium having stored thereon a data structure is provided. The data structure includes at least one field containing data indicative of a parameter designating an object as a layered object.

In yet a further aspect of the present invention, a method for displaying graphical representations on a display is provided. The method utilizes a computer system having a graphical interface that includes the display. The method displays a first window on the display, displays a second window on the display such that at least some portion of the second object window overlaps and underlays the first window, and blends the first and second object windows such that the portion of the second window which overlaps the first window is at least partially visible to a user.

In another aspect of the present invention, a method of providing and selecting two or more objects on a display is provided. The method utilizes a computer system having a graphical user interface including the display and a user interface selection device. The method displays a first of the two or more objects on the display, displays a second of the two or more objects on the display such that the second object overlaps and underlays the first object, blends the first and second object such that the portion of the second object with overlaps the first object is at least partially visible to a user, receives a user selection signal indicative of the user interface selection pointing device pointing to the overlapping portion of the first and second object, and processes the user selection as indicative of a selection of the underlying portion of the second object.

In further aspect of the present invention, a method of animating window objects on a display window is provided. The method utilizes a computer system having a graphical user interface including a display and a user interface selection device. In accordance with the method a window object to be displayed on the display is obtained. The window object is attributed a variable translucency and composited with any underlying object. The translucency is varied to create an animation of the window object.

BRIEF DESCRIPTION OF THE DRAWING

The present invention is described in detail below with reference to the attached drawing figures, wherein.

DETAILED DESCRIPTION OF THE INVENTION

Figure 17:
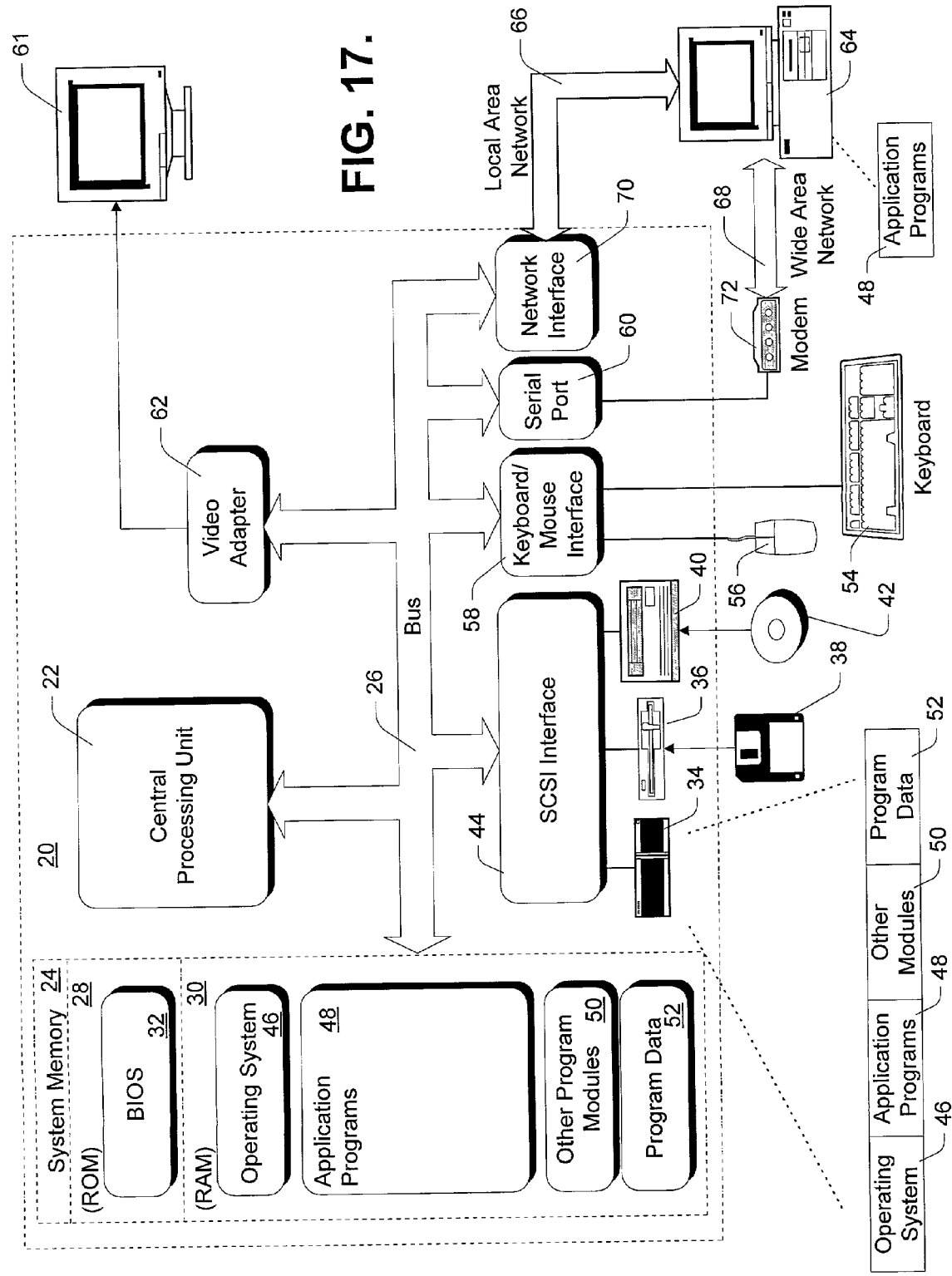
FIG. 17 is a block diagram of a suitable computing system environment for use in implementing the present invention.

The present invention provides a system and structure for implementing layered windows within a graphical operating environment. FIG. 17 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 17, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 17 illustrates operating system 46, application programs 48, other program modules 50, and program data 52.

The computer 20 may also include other removable/non-removable, volatile/nonvolatile computer storage media. By way of example only, FIG. 17 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 17, provide storage of computer readable instructions, data structures, program modules and other data for the computer 20. In FIG. 17, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 17. The logical connections depicted in FIG. 17 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 17 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 50 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 18:
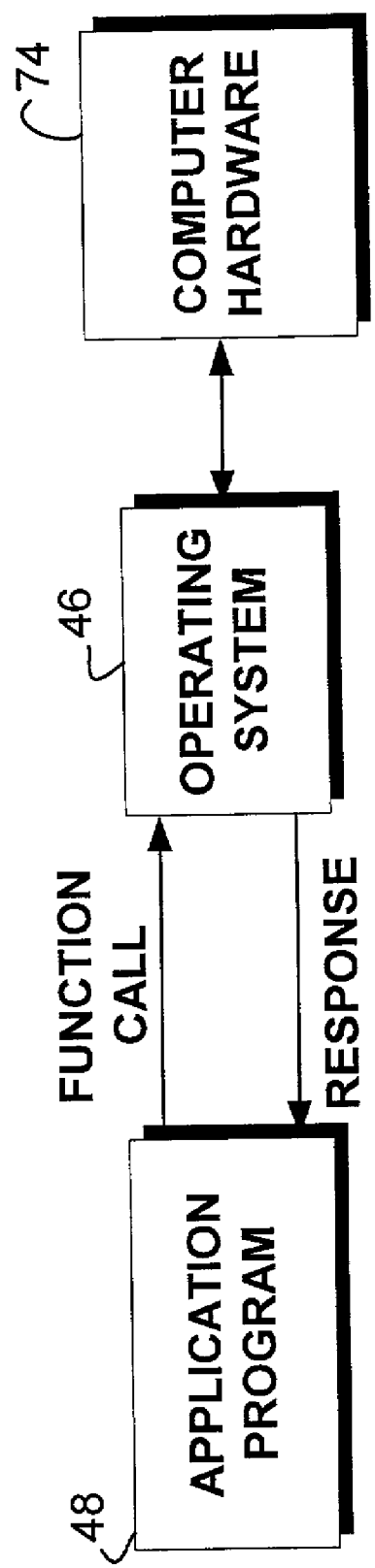
FIG. 18 is a block diagram illustrating the interface between various computer input/output devices, an operating system, and an application program.

FIG. 18 illustrates the interaction between the computer hardware 74, the operating system 46 and an application program 48. Referring now to FIGS. 17 and 18, the operating system 46 is loaded into RAM 30 when the computer 20 is turned on or reset. The operating system 46 provides the basic interface between the computer's resources, the user and the application program 48. The operating system 46 interprets and carries out instructions issued by the user. For example, when the user wants to load an application program 48, the operating system 46 interprets the instruction and causes the processing unit 22 to load the program from the hard disk drive 34 into the RAM 30. Once the application program 48 is loaded into RAM 30, it is executed by the processing unit 22. In the case of large programs, the processing unit 22 loads various portions of the program 48 into RAM 30 as needed.

The operating system 46 also provides a variety of functions or services that allow application program 48 to deal with various types of input/output (I/O). This allows an application program 48 to issue simple function calls that cause the operating system 46 to perform the steps required to accomplish the tasks, such as displaying text on the monitor 61.

With continued reference to FIG. 18, the application program 48 communicates with the operating system 46 by calling predefined function calls provided by the operating system 46. The operating system 46 responds by providing the requested information or executing the requested task.

The present invention relates to a method and structure for implementing layered windows within a graphical operating environment. Specifically, a preferred embodiment of the present invention is a method and structure for displaying multiple, overlapping windows in which at least one object window is attributed a layering property such that underlying display data, such as another window, is blended with the layered window and displayed on the display screen. Such an object window is generally referred to as a "layered window." The underlying windows can include other layered windows or non-layered windows such as an application window or a background screen, that are entirely or partially covered by the top layered window. As employed in the present invention, the terms window or windows represent display objects generated by one or more applications within a graphical operating system implementing a windowing environment. A window may be represented in a substantially rectangular or substantially non-rectangular shape. Moreover, the terms active and inactive application programs are not common terms in the art, but are used in the description of the present invention to provide clarity.

Figure 1:
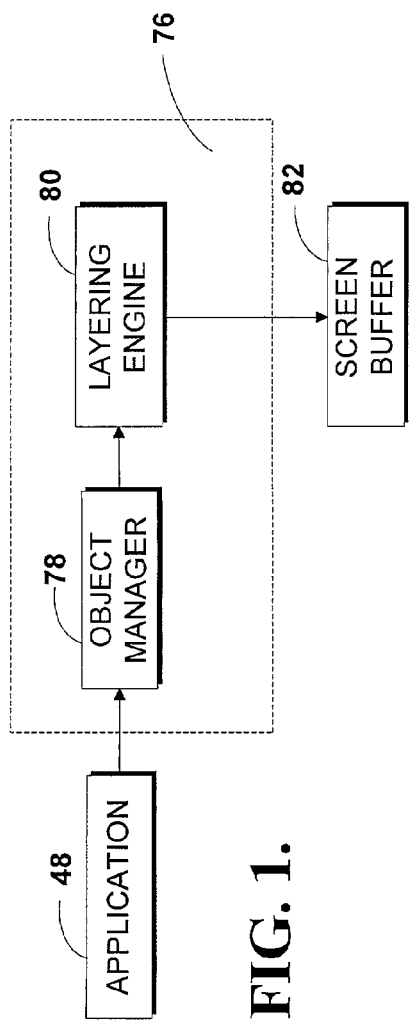
FIG. 1 is a block diagram illustrating the interaction between an application, a display manager and a screen, wherein the display manager includes an object manager and a layering engine in accordance with a preferred embodiment of the present invention.

FIG. 1 is a block diagram illustrating the interaction between an application 48, a display manager 76 and a screen buffer 82 in accordance with the present invention. Preferably, the display manager 76 includes an object manager 78 and a layering engine 80. The object manager 78 maintains a list of display objects, such as windows, that are on the display device screen and also controls how the windows share screen space, delegating the screen real estate to them. The manager 78 interfaces with the application 48 and the layering engine 80 by receiving display requests from the application 48 and by passing to the layering engine 80 various display parameters for each display object. Finally, the screen buffer 82 receives processed display information from the layering engine 80 and transfers it directly to the display.

Figure 2:
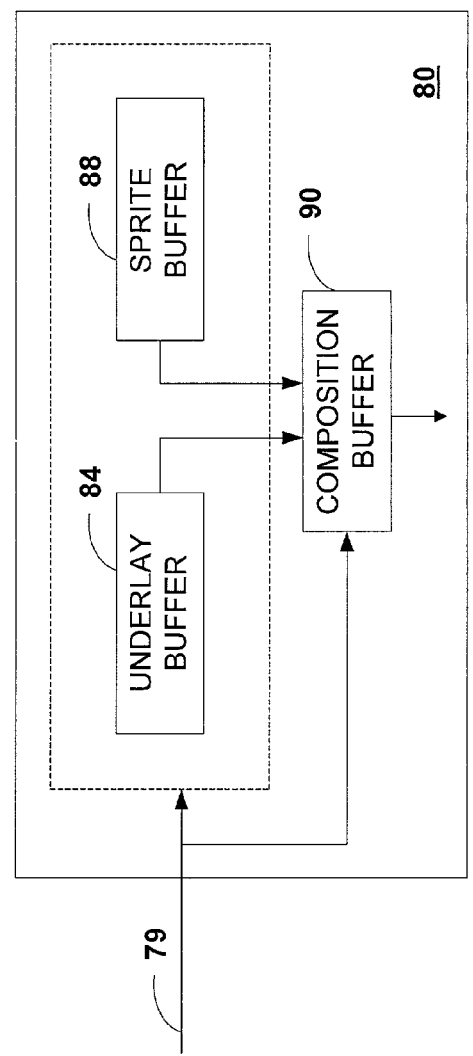
FIG. 2 is a block diagram illustrating the interaction between an underlay buffer, a sprite buffer and a composition buffer in accordance with layering engine of the present invention.

FIG. 2 is a block diagram representative of a layering engine 80, which preferably includes an underlay buffer 84, a sprite buffer 88 and a composition buffer 90. Generally, the layering engine 80 receives display information from the object manager on input line 79, which preferably includes bitmap representations of each object to be displayed and display information related to each bitmap. The incoming display information is processed in either the underlay buffer 84 or in the sprite buffer 88. Alternatively, both the underlay buffer 84 and the sprite buffer 88 can be used to process the display information. Additionally, the layering engine 80 may also be configured such that it contains either an underlay buffer 84 or a sprite buffer 88.

Once the data has been processed within the underlay buffer 84 or the sprite buffer 88, or both, the data is sent to the composition buffer 90 for compositing to the screen. Preferably, the composition buffer 90 alpha-blends the display data by creating an alpha bitmap of transparent and semi-transparent pixels in which each pixel is assigned a transparency component. As would be readily understood, other compositing methods are within the scope of the present invention. Furthermore, a computer system generally includes a graphics display interface (GDI) which generally processes the display information sent to the screen buffer. The layering engine 80 of the present invention works in conjunction with conventional GDI configurations to process the display data.

Figure 7:
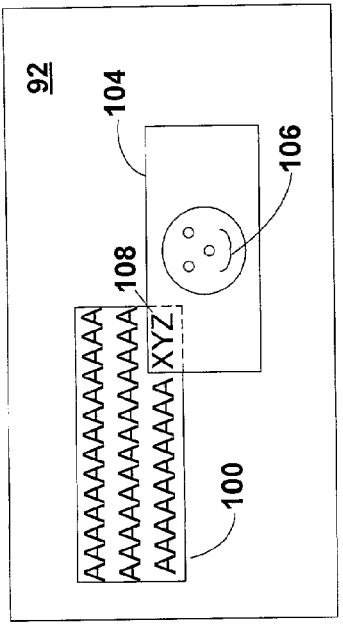
FIG. 7 is a screen shot illustrating the interaction between the non-rectangular display object of FIG. 6.
Figure 8:
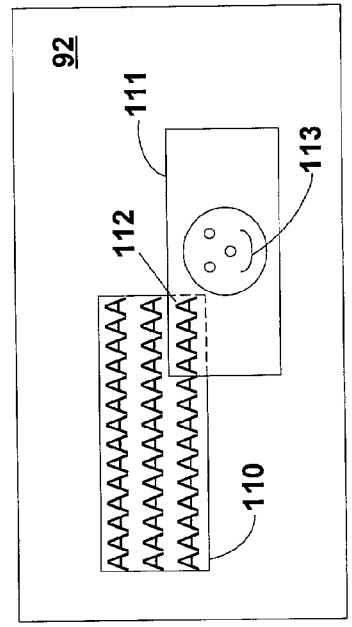
FIG. 8 is a screen shot illustrating the interaction between the non-rectangular display object of FIG. 6.
Figure 9:
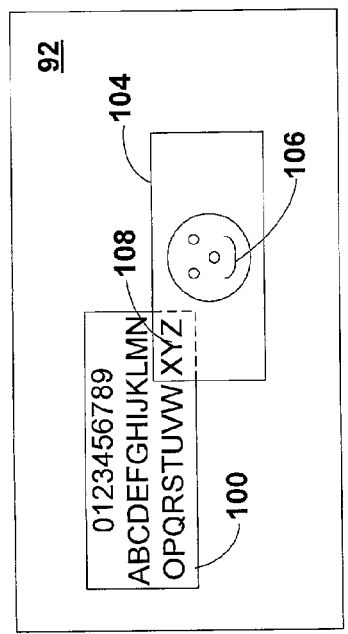
FIG. 9 is a screen shot illustrating the interaction between a non-rectangular display object with another drawing object in accordance with the present invention, wherein the broken lines illustrate the border of the underlying drawing object.
Figure 10:
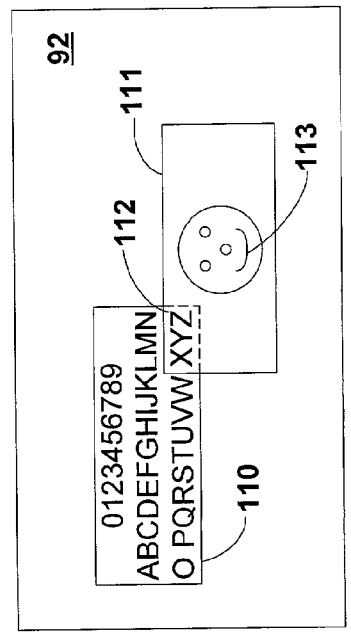
FIG. 10 is a screen shot illustrating the interaction between thenon-rectangular display object with another drawing object of FIG. 9.

FIGS. 3–10 represent screen shots illustrating the interactions between display objects on a typical display screen. Specifically, FIGS. 3–8 illustrate the interactions between the display objects within a conventional graphical operating system, while FIGS. 9–10 illustrate the interactions between display objects when utilizing the method and structures of the present invention.

Figure 3:
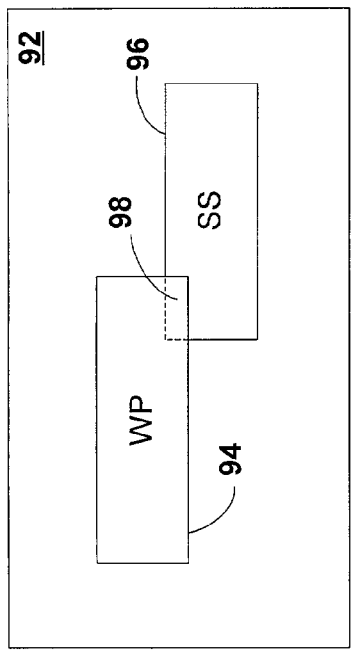
FIG. 3 is a screen shot illustrating the resulting display between two windows non-overlapping windows in a conventional graphical operating system.
Figure 4:
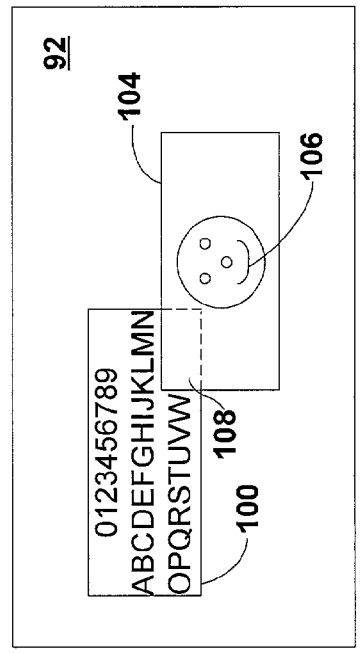
FIG. 4 is a screen shot illustrating the interaction between two overlapping windows in a conventional graphical operating system, wherein the broken lines illustrate the portion of the underlying window which is not visible to the user.

FIG. 3 illustrates a display screen 92 having a first application window 94, such as a word processing application ("WP"), and a second application window 96, such as a spreadsheet application ("SS"). In FIG. 3, the application windows are sized such that they do not overlap, and the user is able to see the entire portion of both windows. With reference to FIG. 4, the screen shot illustrates a situation in which the first application window 94 overlaps the second application window 96, the area of overlap being designated generally by reference numeral 98.

Figure 5:
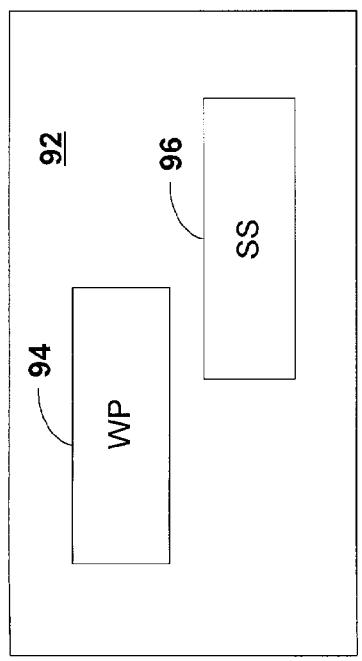
FIG. 5 is a screen shot illustrating the resulting display of the two overlapping windows from FIG. 4.

FIG. 5 illustrates how in a conventional graphical operating system, the application window with the highest "z" priority gains exclusive ownership of the pixel area. While the user is able to view the first application window 94 in its entirety, the second application window 96 is displayed with SS portion of the overlap area 98 (FIG. 4) missing from the display. Accordingly, if the first application window 94 is subsequently moved, or resized, the second application would typically have to regenerate the second application window 96 to redraw the section previously cut out. Additionally, if a user selection device, such as a pointer device, selects the overlapping area 98, the conventional graphical operating system generally interprets this input as a user selection of the window with the highest display order, in this example, the first application window 94.

Figure 6:
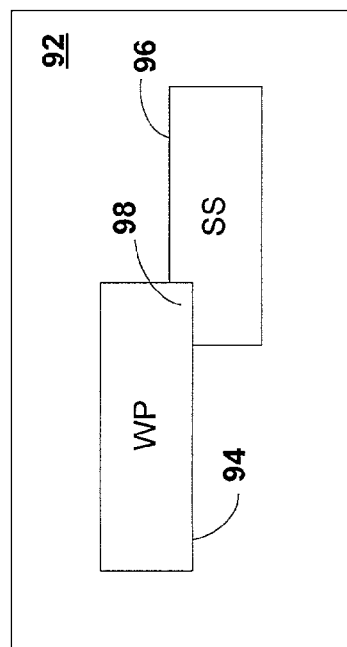
FIG. 6 is a screen shot illustrating the implementation of non-rectangular display objects in a conventional graphical operating system, wherein the broken lines illustrate the portion of the underlying window which is not visible to the user.

FIGS. 6, 7, and 8 illustrate how non-rectangular drawing objects are typically processed in a conventional graphical operating system. With reference to FIG. 6, a first application window 100, such as a word processing program, is displayed on the display screen 92. Additionally, a second application window 104 is displayed on the display screen 92 such that the two windows overlap. However, the second application window 104 is displaying a non-rectangular drawing object, in this example a circular smiley face 106. As shown in FIG. 6, the first application window 100 and the second application window 104 have an overlapping area 108. Assuming that the second application window 104 has a higher "z" priority than the first application window 100, the first application would be drawn with the overlapping area 108 missing from the display, as illustrated in FIG. 6. However, because the face 106 does not occupy this area, the area from the first application window 100 would be unnecessarily omitted. Accordingly, some conventional graphical operating systems unnecessarily omit display information.

FIG. 7 illustrates a manner in which some conventional graphical operating systems attempt to correct this deficiency. Although the second application window 104 still overlaps the first application window 100, the second window 104 has attempted to eliminate the omitted area by copying the overlapped data from the first window 100 into its upper left-hand corner. Thus, to the user, the first window 100 appears with the entire display area intact and the second window 104 is seen only as the circular smiley face 106. However, as illustrated in FIG. 8, if the display in the first application window 100 is regenerated, the copied data in the second application window becomes stale making the display incorrect and requiring a complete regeneration of the second window 104 as well. Accordingly, if the second window 104 is inactive, system performance is reduced. Moreover, if the user attempts to use a pointing device to select the graphics in the overlapping area 108, the input is attributed to the second window 104, preventing the user from selecting any of the graphics of the underlying window 100 in the overlapping area 108.

FIG. 9 is illustrative of a screen shot of the display screen 92 utilizing the layered object window method of the present invention. The display screen 92 includes a first application window 110 containing some textual or graphical information. The display screen also includes a second application window 111 including a circular smiley face 113. Although both display windows in FIG. 9 are rectangular windows, the present invention is equally applicable to situations where one or more of the display windows are non-rectangular windows (e.g., where face 113 is configured as a stand-alone drawing object) without the confines of the rectangular window. Unlike conventional approaches, the present invention does not restrict each pixel within the display screen to ownership by a single drawing window with the highest "z" order. Instead, the pixel may be blended with an underlying display window if the window, such as the second window 111, is a layered window and is attributed an opaqueness level less than entirely opaque. Preferably, opaqueness levels are defined as an integer in the range of approximately 0 for completely transparent to 255 for completely opaque. Additionally, if the opaqueness level of a window is "0", the present invention preferably attributes the window with a translucency property. If a window has a translucency property, a user selection device input, such a pointing device, will be passed to whatever the next highest drawing object is below the translucent window. This is generally referred to as "hit testing."

With continued reference to FIG. 9, in this example, the second application window 113 is attributed an opaqueness level such that the smiley face 113 is visible to the user while the remaining portions of the window 111 are transparent to the user. Although the second window 111 overlaps portions of the first window 110, the underlying text is allowed to show through in the overlap area 112 because the transparent portion of the second application window 111 is blended with display area of the underlying window 110. Thus, with reference to FIG. 10, if the underlying data in the first application window 110 changes, the underlying text in the overlap area 112 also changes. Additionally, if the overlapping area 112 of the second application window 111 is attributed a "0" opaqueness level, any user inputs at the overlap area 112 would be attributed to the underlying first application window 110.

The present invention preferably utilizes two separate embodiments or a combination of both embodiments to implement layered windows on the display screen. One embodiment of the present invention implements layered windows utilizing one or more underlay buffers to redirect overlapping portions of one or more of the underlying windows for compositing. This embodiment is referred to generally as "front-end compositing." Preferably, under front-end compositing the graphical operating system provides the layering engine 80 (FIG. 1) with a first bitmap representing the contents of the layered window and any non-overlapping portions of underlying windows. Preferably, the bitmaps are sent to the layering engine 80 by executing a first drawing call containing solely the data that is to be directly written to the display screen. Additionally, the graphical operating system also provides the layering engine 80 with a second bitmap representing the contents of the display underneath the layered window. Preferably, the second bitmap is sent to the layering engine 80 by executing a second drawing call containing the underlying data which is redirected to one or more underlay buffers 84 (FIG. 2). The second bitmap is stored in one or more underlay buffers in memory. The graphical operating system also provides the layering engine 80 display information for each display window, which preferably includes size and format information, z order information, compositing and positional information, and clipping information. Preferably, the display information is transferred to the graphical operating system utilizing a variety of attribute setting APIs. Alternatively, the drawing attributes may attached or embedded within the drawing bitmaps.

Once the layered window bitmap, the underlay buffer data, and the display information is received, the data is composited in the composition buffer 90 (FIG. 2) and sent to the display via the screen buffer 82 (FIG. 1). Preferably, compositing includes alpha-blending the resulting bitmaps according to the z order and the opacity of the windows. As would be readily understood, alternative methods of compositing are within the scope of the present invention. Accordingly, if the layered windows is moved or resized, any previously covered portions of the underlying window will be transferred from the underlay buffer to the display screen without requiring a regeneration of the display by the application. Additionally, as the underlying window data is updated, the data in the underlay buffer 84 is also updated.

Figure 11:
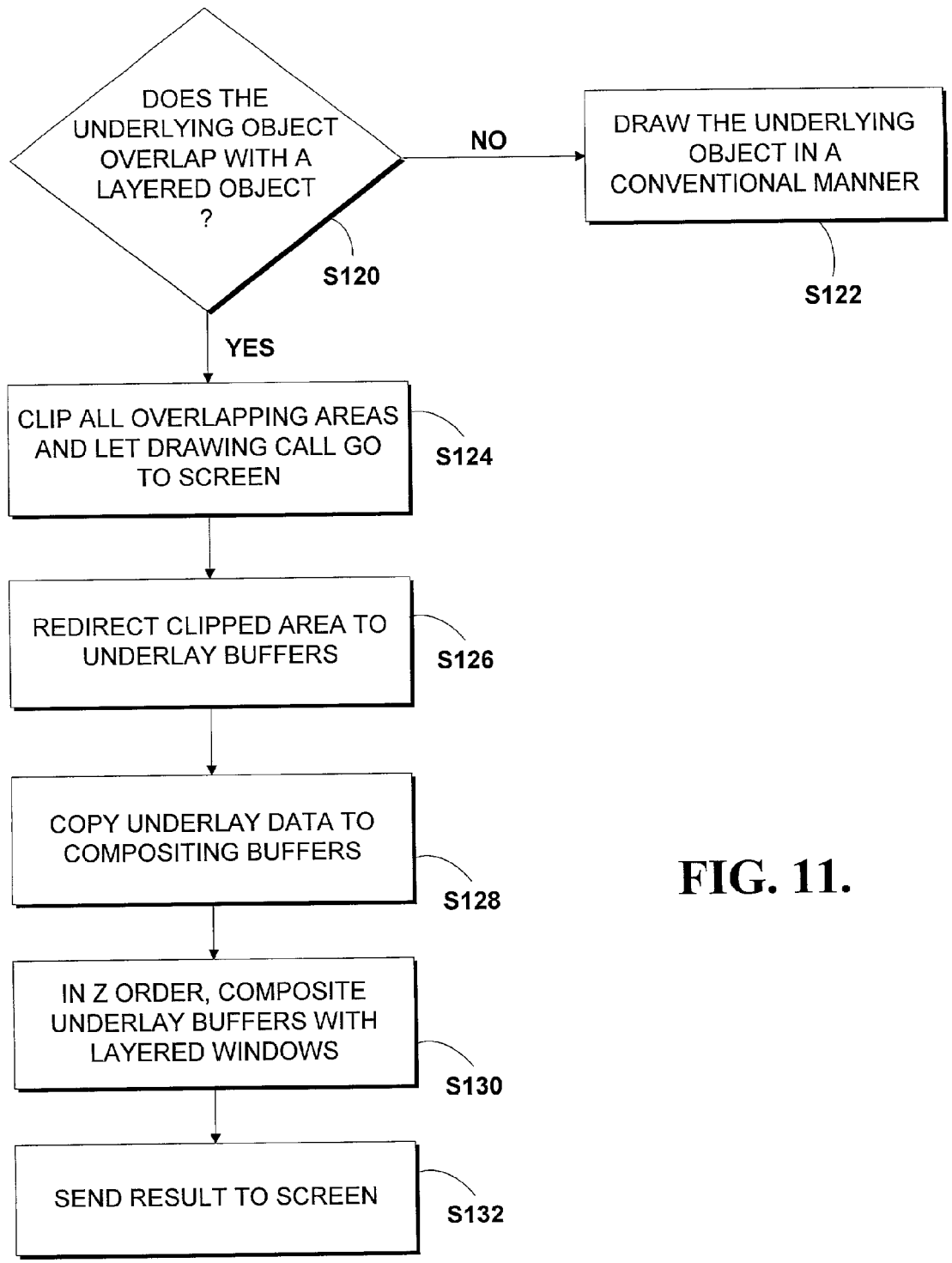
FIG. 11 is flow diagram illustrating a method for drawing an underlying display object in accordance with a preferred embodiment of the present invention.

FIG. 11 is a flow diagram illustrating a method by which an underlying window is drawn after the layered window is created. First, the method must determine, at S120, whether the underlying window actually overlaps with the layered window. If it does not, the underlying window is drawn in a conventional manner at S122, which preferably includes creating and displaying a bitmap representation of the underlying window. If at S120 a portion of the underlying window does overlap with the layered window, the overlapping areas are clipped and the remaining non-overlapping portion of the underlying window is drawn to the display screen, preferably via a drawing call, at S124. At S126, the clipped areas are copied to one or more underlying buffers. Preferably, a second drawing call is sent to the graphical operating system which redirects the clipped area to the one or more underlay buffers. At S128, the contents of the underlay buffer are transferred to the compositing buffer. Accordingly, at S130, the compositing buffer blends the layered window with the underlay buffer in z order. The result is then directed to the screen at S132. Accordingly, the layered window and the non-overlapping portions of the underlying window are composited with the overlapping portions of the underlying windows stored in the underlay buffer to enhance the display.

Figure 12:
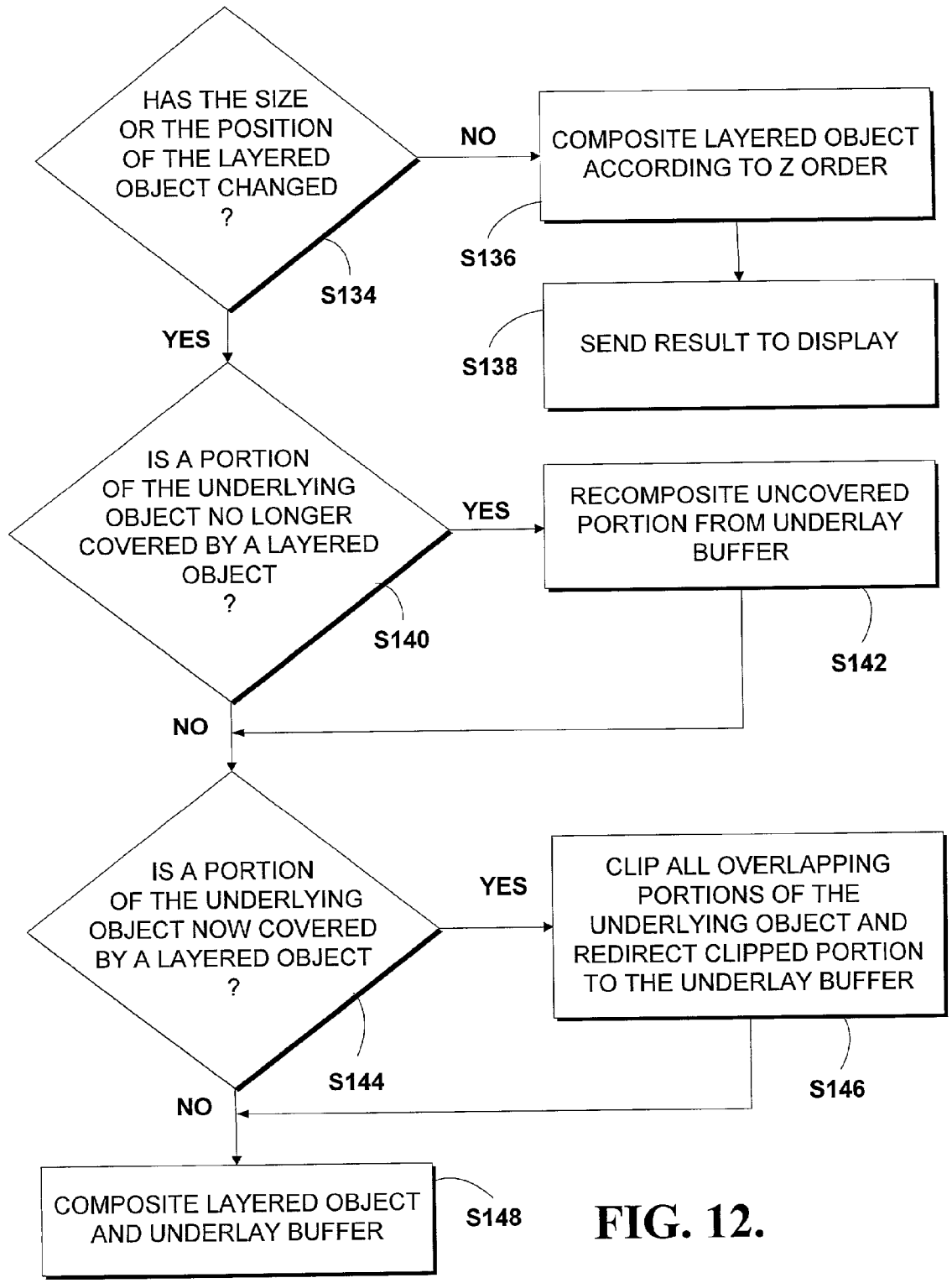
FIG. 12 is a flow diagram illustrating a method for updating the underlying display object in accordance with a preferred embodiment of the present invention.
Figure 13A:
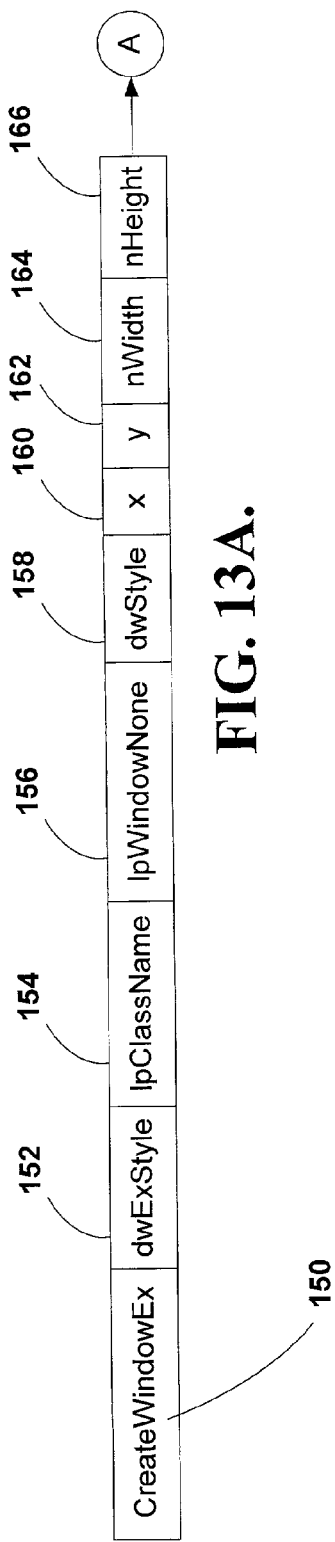
FIG. 13 is a block diagram illustrating a CreateWindowEx API utilized to implement a layered object in accordance with the present invention.
Figure 13B:
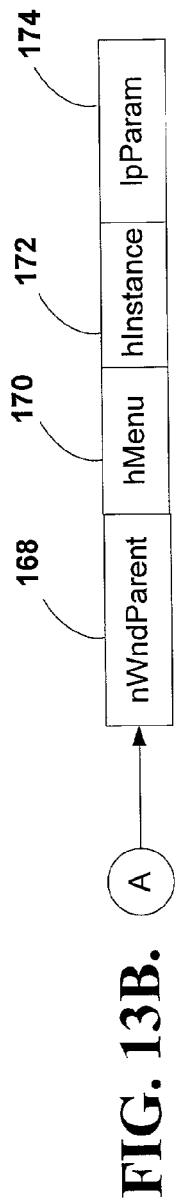

FIG. 12 is a flow diagram illustrating a method of refreshing the underlying window in the event the layered window is moved or resized. At S134, the method determines whether the size or position of the object window has changed. If not, the layered window and the underlay buffer are composited in the z order at S136 and the result is sent to the display at S138. If either the size or the position of the layered window has changed at S134, the method determines whether a portion of underlying windows previously covered are no longer covered by the layered window at S140. If so, the uncovered portion of the underlying window is recomposited from the underlay buffer to the display at S142. If either no portion of the underlying window is uncovered at S140 or a newly uncovered portion has been recomposited to the display bitmap at S142, the method determines whether a portion previously uncovered is now covered by the layered window at S144. If so, the newly covered portion is clipped and sent to the underlay buffer at S146. If either no portion of the underlying object window is covered at S144 or the covered portion is clipped and sent to the underlay buffer at S146, the layered window bitmap and the underlay bitmaps are composited and updated on the display at S148.

Another embodiment of the present invention utilizes hardware image rendering to display and manipulate the layered windows without requiring resource consuming window regenerations. This embodiment is characterized as "back-end compositing." Under back-end compositing, bitmaps representing the contents of windows to be displayed, which preferably includes layered windows, are created as hardware sprites for display by the graphics hardware. Additionally, the operating system communicates to the graphics hardware and the graphics driver display information. Preferably, the display information includes the size and format of the bitmap, the z order information for the layered window, the compositing and positional information, and any optional clipping information. Once the data has been received and processed by the graphics driver and graphics hardware, the graphics devices store complete copies of the layered window sprite and any underlying window sprites in memory. Accordingly, the composition buffer displays the visible portions of the window sprites and composites any overlapping portions of the underlying window sprites with the layered window sprites, regardless of whether the underlying windows are layered.

One specific example of graphics hardware which implements and composite bitmap sprites into a display is Microsoft Corporation's U.S. Pat. No. 5,867,166 to Myhrvold et al., which is incorporated herein by reference. As would be understood, because a single display object can be organized into several hardware sprites, a display request from an application may result into the creation of more than one hardware sprite. Additionally, if the layered window sprite is moved or resized, any newly uncovered portion of the underlying window sprite is displayed by recalling the complete copy of the sprite from memory without requiring a regeneration of the display from the application.

A third embodiment of the present invention utilizes both front-end compositing and back-end compositing simultaneously to generate layered windows on the display screen. Under this embodiment, the layering engine would preferably designate a maximum number of windows, typically organized in descending z order, to create as hardware sprites and then process by back-end compositing. Once the maximum number of hardware sprites is reached, any remaining windows would be processed according to front-end compositing. Thus, in situations in which a large number of graphics display windows are required, the combination of front-end and back-end compositing allows for more efficient use of the system resources.

FIGS. 13–16 are block diagrams illustrating the application program interfaces (APIs) preferably utilized by the present invention to implement layered displays. Specifically, FIGS. 13A and 13B set forth a CreateWindowEx API 150 utilized by the present invention to designate a layered window when creating the window. CreateWindowEx includes a dwExStyle parameter 152 which specifies an extended window style to be created. Preferably, to create a layered object window, dwExStyle parameter 152 is set to WS_EX_LAYERED to indicate a layered window. Additionally, the CreateWindowEx API 150 preferably includes additional parameters lpClassName 154, lpWindowNone 156, dwStyle 158, x 160, y 163, nWidth 164, nHeight 166, NwndParent 168, hMenu 170, hinstance 172, and lpParam 174 which retain their conventional function and definition in implementing a layered window. As would be readily understood, additional, modified, or different API parameters would be considered within the scope of the present invention.

Figure 14:
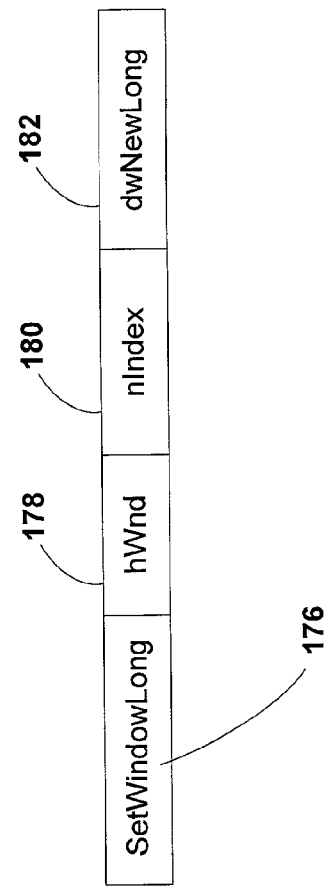
FIG. 14 is a block diagram illustrating a SetWindowLong API utilized to implement a layered window of the present invention.

FIG. 14 is a block diagram of a SetWindowLong API 176 utilized by the present invention to change the attribute of an window after it has been created. As applied to the present invention, the SetWindowLong API 176 can be used to change the attributes of a previously created window to make the object window a layered window. Specifically, the SetWindowLong API 176 includes a hWnd parameter 178 which contains a handle to the window. Additionally, an nIndex parameter 180 designates the zero-based offset value of the action affecting the window. Preferably, the nIndex parameter 180 is designated with a GWL_EXSTYLE indicator to designate an extended window style modification. Finally, the SetWindowLong API 140 includes a dwNewLong parameter 182 which includes the replacement value. Preferably, the dwNewLong parameter 182 is set to WS_EX_LAYERED to indicate a change of the window into a layered window. As would be readily understood, additional, modified or different API parameters are within the scope of the present invention.

Figure 15:
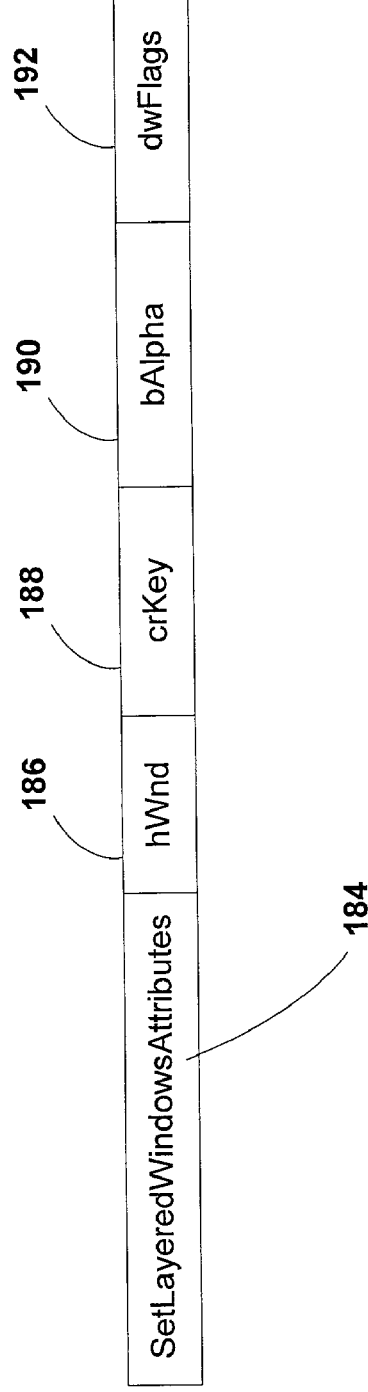
FIG. 15 is a block diagram illustrating a SetLayeredWindowsAttributes API utilized to implement a layered object in accordance with the present invention.
Figure 16:
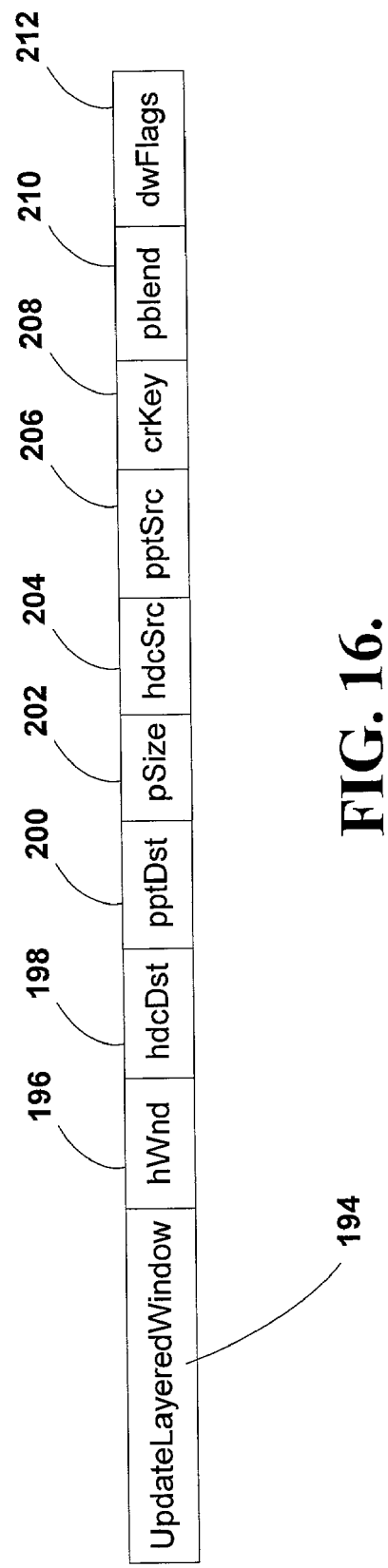
FIG. 16 is a block diagram illustrating an UpdateLayeredWindow API utilized to implement a layered object in accordance with the present invention.

FIGS. 15 and 16 are block diagrams illustrating the SetLayeredWindowAttributes 184 and UpdateLayeredWindow 194 APIs utilized to specificy the opacity level of a layered window. Preferably, a layered window does not become visible on the display screen after it has been created by the CreateWindowEx (FIG. 13) or the SetWindowLong (FIG. 14) until the opacity level has been set.

With reference to FIG. 15, the SetLayeredWindowAttributes API 184 sets the opacity and tranparency color key of a layered window. The API 184 includes a hWnd parameter 186 having a handle to the layered window. A crKey parameter 188 includes a pointer to a COLORREF value that preferably specifies the transparency color key to be used when composing the layered window. Accordingly, all pixels painted by the object window in the designated color will be transparent. A bAlpha parameter 190 includes an Alpha value used to describe the opacity of the layered window. When bAlpha 190 is 0, the layered window is completely transparent and when bAlpha 190 is 255, the object window is opaque. Finally, dwFlags parameter 192 specifies an action to take. As would be readily understood, additional, modified or different parameters or integer values to indicated opacity are within the scope of the present invention.

With reference to FIG. 16, the UpdateLayeredWindow API 194 updates the position, size, shape, content and translucency of a layered window. Specifically, the API 194 includes a hWnd parameter 196 which is a handle to the layered window and a hdcDst parameter 198 which is a handle to the device context. A pptDst parameter 200 is pointer to a new screen position of a layered window and a psize parameter 202 specifies a new size for the layered window. A hdcSrc parameter 204 is a handle to a device context for the surface that defines the layered window and a pptSrc parameter 206 specifies the location of the layer in the device context. A crKey parameter 208 specifies the color key to be used when composing the layered window and a pblend parameter 210 specifies the transparency value to be used when composing the layered window. Finally, a dwFlags parameter 212 specifies values to be utilized with the function. Preferably, the dwFlags parameter 212 is set to ULW_ALPHA to use the pblend parameter as the blend function. Alternatively, the dwFlags parameter 212 may be set to ULW_COLORKEY if crKey is to be used as the transparency color or set to ULW_OPAQUE if the layered window is to be drawn as opaque. As would be readily understood, additional, modified or different parameters are within the scope of the present invention.

Preferably, the method and structure for implementing layered windows is implemented in Microsoft Corporation's "WINDOWS 2000™" operating system. By utilizing the layered windows method and structure, the present invention allows application display windows to share pixel space and better utilize computer system resources. One example of an application of the present invention includes shadowing of display windows, such as a cursor, to improve user tracking.

Another application of the present invention includes seemlessly animating various window objects on the display. For example, the user is presented with a window object representing a graphical menu requiring a user input from a selection device. When the user makes a selection, the selection is visually verified by highlighting the menu selection with a solid colored bar. Additionally, the window object is attributed a variable translucency in accordance with the present invention. Thus, by making the window object more translucent, the solid colored bar progressively blends in with any underlying objects, including any window objects activated by the user's selection. By varying the translucency at a slow enough pace, however, the window object appears to fade out, allowing the user to verify that the correct menu selection was selected. Similarly, the translucency of a window object may be variably increased causing it to appear to fade in to the user. As would be readily understood, the variation of a window object translucency creates various other transition or animation effects.

While many program languages could be used to create the object windows and functions of the present invention, the present invention may preferably be coded by an object oriented language such as Microsoft Corporation's "VISUAL C++®" OR "VISUAL BASIC®" programming languages.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. In a computer system having a graphical user interface including a display and a user interface selection device, a method of animating window objects on the display, the method comprising:
    obtaining a window object to be displayed on the display;
    attributing the window object a variable translucency;
    compositing the window object with any underlying objects; and
    varying the translucency of the window object to create an animation of the window object.

2. The method as recited in claim 1, wherein the window object is representative of a menu, the method further comprising the steps of:
    retrieving a set of menu entries for the menu;
    displaying the set of menu entries;
    receiving a menu entry selection signal indicative of the user interface selection device pointing at one of the menu entries; displaying a visual indication of the menu entry selection; blending the visual indication of the menu entry selection and any underlying graphics such that the visual indication of the menu entry selection progressively fades until it is no longer visible.

3. The method as recited in claim 2, wherein the step of displaying the visual indication includes highlighting the menu entry selection with a solid color.

4. The method as recited in claim 2, wherein the blending step includes progressively displaying the highlighted menu entry selection in a faded manner.

5. The method as recited in claim 2, wherein the step of displaying the visual indication includes attributing an opaqueness value to the visual indication.

6. The method as recited in claim 5, wherein the opaqueness value is an integer having values between approximately 0 and 255.

7. The method as recited in claim 5, wherein the blending step includes reducing the opaqueness value attributed to the visual indication of the menu entry selection.

8. The method as recited in claim 1 further comprising the step of displaying a visual indication of the window object, wherein the varying step includes adjusting the translucency of the window object such that the visual indication of the window object progressively fades in until it is fully non-translucent.

9. A computer-readable medium having computer-executable instructions for performing the step recited in claim 1.

10. A computer system having a memory, an operating system and a central processor, the computer system operable to carry out the steps recited in claim 1.

11. A computer-readable medium having computer-executable instructions for performing a method of animating window objects on a display in a computer system having a graphical user interface including the display and a user interface selection device, the method comprising:
    obtaining a window object to be displayed on the display;
    attributing the window object a variable translucency;
    compositing the window object with any underlying objects; and
    varying the translucency of the window object to create an animation of the window object.

12. The computer-readable medium of claim 11, wherein the window object is representative of a menu, the method further comprising the steps of:
    retrieving a set of menu entries for the menu;
    displaying the set of menu entries;
    receiving a menu entry selection signal indicative of the user interface selection device pointing at one of the menu entries;
    displaying a visual indication of the menu entry selection; and
    blending the visual indication of the menu entry selection and any underlying graphics such that the visual indication of the menu entry selection progressively fades until it is no longer visible.

13. The computer-readable medium of claim 12, wherein the step of displaying the visual indication includes highlighting the menu entry selection with a solid color.

14. The computer-readable medium of claim 12, wherein the blending step includes progressively displaying the highlighted menu entry selection in a faded manner.

15. The computer-readable medium of claim 12, wherein the step of displaying the visual indication includes attributing an opaqueness value to the visual indication.

16. The computer-readable medium of claim 15, wherein the opaqueness value is an integer having values between approximately 0 and 255.

17. The computer-readable medium of claim 15, wherein the blending step includes reducing the opaqueness value attributed to the visual indication of the menu entry selection.

18. The computer-readable medium of claim 11 further comprising the step of displaying a visual indication of the window object, wherein the varying step includes adjusting the translucency of the window object such that the visual indication of the window object progressively fades in until it is fully non-translucent.

* * * * *